(12) United States Patent
Vik et al.

(10) Patent No.: US 7,370,865 B2
(45) Date of Patent: May 13, 2008

(54) ASSEMBLY INCLUDING FACE SEAL SIZED TO INTERFERENCE FIT IN HOUSING

(75) Inventors: Brian D. Vik, Barnesville, MN (US); Brian L. Gregor, Kindred, ND (US)

(73) Assignee: CNH America LLC, New Holland, PA (US)

( * ) Notice: Subject to any disclaimer, the term of this patent is extended or adjusted under 35 U.S.C. 154(b) by 109 days.

(21) Appl. No.: 11/058,266

(22) Filed: Feb. 15, 2005

(65) Prior Publication Data

US 2006/0181147 A1    Aug. 17, 2006

(51) Int. Cl.
F16J 15/34    (2006.01)
F16J 15/32    (2006.01)
F16F 1/34    (2006.01)

(52) U.S. Cl. .................. 277/380; 277/551; 29/451; 305/103; 305/136

(58) Field of Classification Search ............ 301/105.1, 301/124.1; 305/100, 103, 136; 277/377, 277/379, 380, 385, 551; 29/450, 451
See application file for complete search history.

(56) References Cited

U.S. PATENT DOCUMENTS

| | | | |
|---|---|---|---|
| 3,241,843 A | 3/1966 | Hatch et al. | |
| 3,241,844 A | 3/1966 | Hatch et al. | |
| 3,940,154 A * | 2/1976 | Olsson | 277/381 |
| 4,094,516 A | 6/1978 | Morley et al. | |
| 4,195,852 A | 4/1980 | Roley et al. | |
| 4,256,315 A | 3/1981 | Larson et al. | |
| 4,262,914 A | 4/1981 | Roley | |
| 5,245,741 A * | 9/1993 | Smith et al. | 29/450 |
| 6,397,446 B1 * | 6/2002 | Whetstone | 29/235 |
| 2002/0105147 A1 | 8/2002 | Zutz | |

OTHER PUBLICATIONS

Factory Direct Parts, Partsfinder Website, Reference Manual and Installation Guide for Heavy Duty Face Seals (Feb. 16, 1998)☐☐http://web.archive.org/web/19980216022244/http://www.partsfinder.ca/parts/seals/duocone/manual/.*
ASTM Standard D 395, "Standard Test Methods for Rubber Property-Compression Set", Sep. 2003.
O-Ring Design & Materials Guide, "Thermal Properties", published by R.L. Hudson & Co.

* cited by examiner

*Primary Examiner*—Russell D. Stormer
*Assistant Examiner*—Kip Kotter
(74) *Attorney, Agent, or Firm*—Patrick M. Sheldrake; John William Stader; Michael G. Harms

(57) ABSTRACT

An assembly for a tracked vehicle includes a wheel defining a wheel cavity and a face seal including a rigid sealing ring and a flexible ring disposed on the sealing ring, the flexible ring having an outermost substantially cylindrical surface defining a maximum diameter of the ring. The flexible ring sized so that the maximum diameter is slightly larger than the wheel cavity.

10 Claims, 5 Drawing Sheets

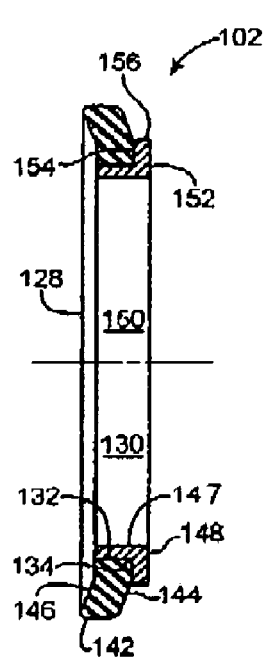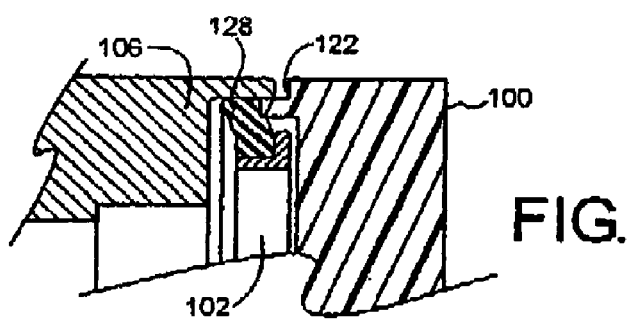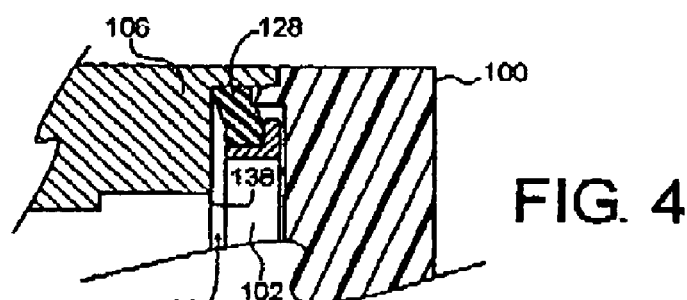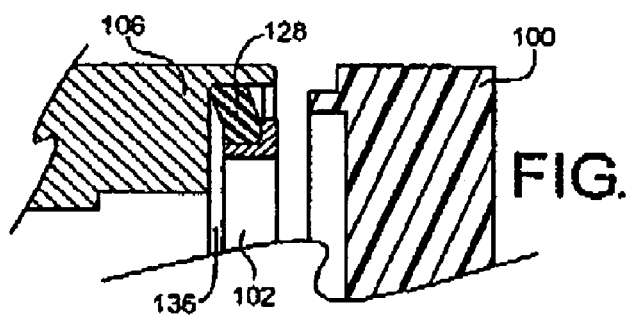
FIG. 1
FIG. 3
FIG. 4
FIG. 5

US 7,370,865 B2

ASSEMBLY INCLUDING FACE SEAL SIZED TO INTERFERENCE FIT IN HOUSING

FIELD OF THE INVENTION

The present invention generally relates to seals for rotating shafts. More particularly, it relates to face seals. Even more particularly, it relates to face seals configured for force fits, applications therefore, and tools for installing them.

BACKGROUND OF THE INVENTION

Axial face seals (or "face seals") are used to seal two relatively rotating bodies against each other. They keep dirt and other contamination from reaching sensitive parts of a machine such as bearings and retain fluid within a fluid-filled housing.

Face seals are designed to be mounted and assembled as pairs in a face-to-face relationship with the two sealing rings (typically highly polished metal rings) facing each other and rotating relative to each other. Two-piece seals are considered to be particularly susceptible to misassembly, misalignment, wear and damage because the two sealing rings, both being made of metal, are prone to wear and overheating.

An example of a face seal can be found in U.S. Pat. No. 3,241,844. The '844 patent shows a known arrangement of face seals: two face-to-face sealing rings 23, 24 that are respectively supported by resilient elastomeric rings 28, 29. As the '844 patent explains, the elastomeric rings are generally frustoconical in shape and are formed of a rubber or rubberlike material which can be compressed.

In the known face seal, each of the sealing rings floats in its respective elastomeric supporting ring and self-adjusts its position to align with the adjacent abutting ring. If either of the two elastomeric supporting rings is not inserted perfectly in its cavity, the sealing ring that it supports will be offset, such that the plane defined by the sealing-ring sealing surface will not be orthogonal to the rotational axis of the seal. Since the sealing ring is cocked, it can, in turn, press with unequal pressure against the other sealing ring and cause it, too, to be cocked in its cavity. Moreover, lubricating fluid may not be able to circulate between the sealing surfaces as it should. Thus, as a result of the cocked orientation of the sealing rings, their sealing surfaces can wear unevenly or excessively.

In order to ensure proper positioning of seals, it is critical that the elasromeric supporting rings of face seats be properly seated in the cavity or bore of a housing that supports them. Known face seals ensure proper seating of the elastomeric supporting rings with a slight gap or clearance between the outermost surface of the body of the supporting ring (e.g. surface 31 shown in FIGS. 3 and 4 in the '844 patent) and the right circular cylindrical inner wall of the cavity in the housing supporting it.

This gap or clearance causes problems during assembly since the seals do not actually touch the walls of the cavities in which they are inserted and there is nothing to hold the face seals in the proper position in the cavity as they are brought together and pressed against each other during final assembly. As the '844 patent explains, face-seal assemblies often fall out or fall over before the wheel (in the '844 patent) is completely assembled.

To prevent this from happening, the '844 patent teaches a lip or ribbon 34 to hold the seal in place during assembly. The lip or ribbon 34 is disposed on the outer edge of the seal and has a slightly larger diameter than the body of the elastomeric ring—providing a locational interference fit that is just great enough to hold the seal in position and prevent it from falling out once inserted into its cavity. The locational interference fit between lip or ribbon 34 and the cavity serves to support the seal within its cavity, locate it properly, and prevent it from wobbling around and becoming misaligned.

This locational interference fit is distinguishable from a standard interference fit (also called simply an interference fit) by the degree of interference. In a standard interference fit the body of the elastomeric supporting ring is larger than the cavity in the housing into which the supporting ring is designed to fit. As a result, the elastomeric supporting ring itself must be deformed to fit into the cavity.

We know of no standard interference fit in the face seal art. Its absence is because face seals designed to interference fit into a cavity in a housing are nearly impossible to assembly properly. Among other problems, the body of the elastomeric supporting ring designed for a standard interference fit tends to buckle and misalign the sealing ring.

Turning now to a locational interference fit, only a lip, ribbon, or minor protuberance deforms as the face seal is assembled into a cavity, and such locational interference fits are used to hold the face seal in the cavity during assembly (as disclosed in the '844 patent). The lip or ribbon 34 (in one form or another) is common to all face seals known to us.

SUMMARY OF THE INVENTION

According to one aspect of the invention, an assembly comprises a wheel defining a wheel cavity and a face seal including a rigid sealing ring and a flexible ring disposed on the sealing ring, the flexible ring having an outermost substantially cylindrical surface defining a maximum diameter of the ring. The flexible ring is sized so that the maximum diameter is slightly larger than the wheel cavity. The face seal is disposed within the wheel cavity whereby the face seal is interference fit into the wheel cavity.

According to another aspect of the invention, a track assembly for a tracked vehicle includes a wheel, a shaft, a track, a retainer and at least two opposing face seals. The wheel includes a hub, the hub defining a hole and a bore, the hole extending through the wheel and the bore being disposed at one end of the hole. The shaft is disposed in the hole, whereby the wheel is rotatably supported by the shaft. The track is supported by the wheel. A retainer is disposed in opposing relation to the bore and defines a cavity. The at least two opposed face seals are disposed in a space defined by the retainer and the hub of the wheel, with each face seal including a flexible supporting ring and a rigid sealing ring, the supporting ring having opposed left and right surfaces defining opposed inner and outer surfaces in a radially spaced relationship, the outer surface being substantially smooth from the left to the right surfaces and defining a diameter of the flexible ring, and the diameter of each supporting ring being larger than one of the bore and the cavity. The outer surface of each supporting ring abuts at least one of (i) a surface of the wheel defining the bore and (ii) a surface defining the cavity of the retainer.

BRIEF DESCRIPTION OF THE DRAWINGS

FIG. 1 is a cross-sectional view of a face seal according to the preferred embodiment of the invention.

FIG. 2 is a cross-section taken through the central longitudinal axis of the housing, face seal and tool. It shows the components in their proper position, just before the tool installs the seal in the housing.

FIG. 3 is a first fragmentary cross section of the housing, face seal and tool in a first relative position. This position illustrates the respective locations of the housing, seal and tool partway through the seal installation process, after the tool has forced the outer edge of the elastomeric ring into force or interference fit engagement with the housing.

FIG. 4 is a second fragmentary cross section of the housing, face seal and tool in a second relative position. This position illustrates the respective locations of the housing, seal and tool when the tool has inserted the face seal completely into the housing, but has not yet been removed.

FIG. 5 is a third fragmentary cross section of the housing, face seal and tool in a third relative position. This position illustrates the respective locations of the housing, seal and tool when the tool has inserted the face seal completely into the housing and has been withdrawn.

FIG. 7 shows the shaft assembly on which the wheel is mounted, the bearings that support the wheel and the face seals that keep lubricating fluid in the wheel bearings.

DETAILED DESCRIPTION OF THE PREFERRED EMBODIMENTS

Figure 2:
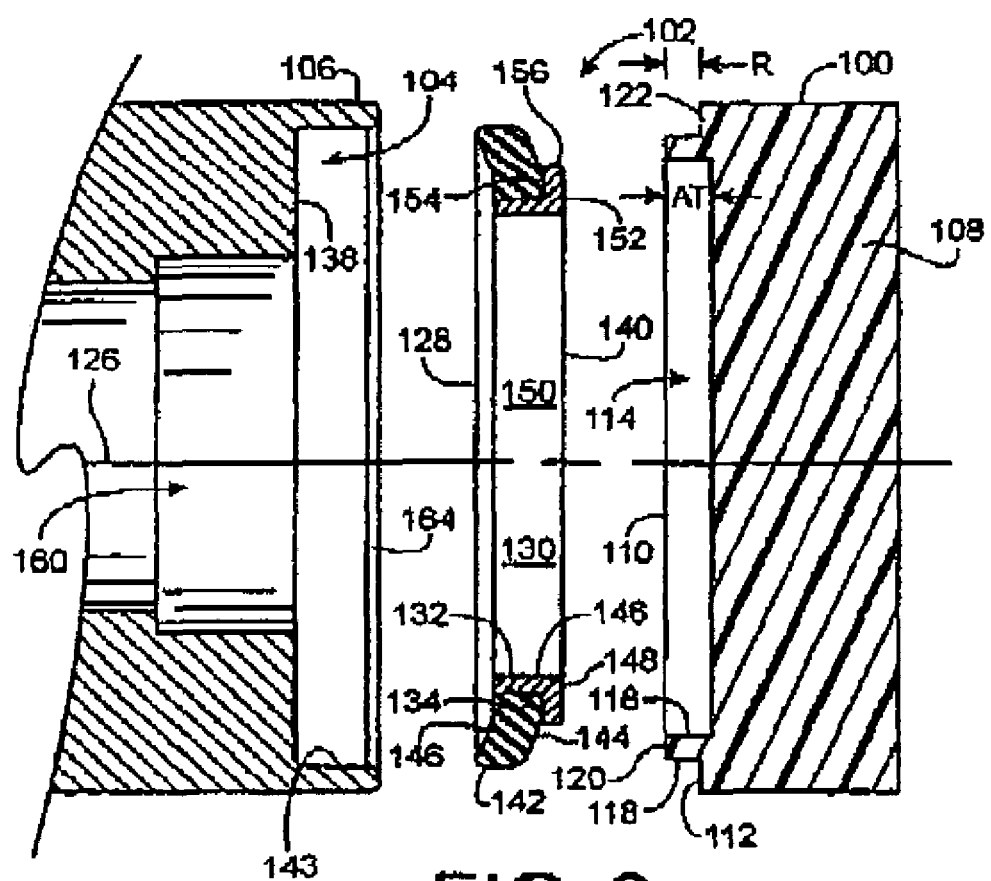
FIG. 2 is an exploded cross-sectional view of (1) a housing including a cavity in which a face seal is to be installed, (2) the face seal to be installed in the housing, and (3) a tool for installing the face seal that is configured to mate with the face seal and the housing.

While the present invention is susceptible of being made in any of several different forms, the drawings show a preferred form of the invention. One should understand, however, that this is just one of many ways the invention can be made. Nor should any feature of the illustrated embodiment be considered a part of the invention, unless that feature is mentioned in the claims. In the drawings, like reference numerals refer to like parts throughout the several views.

Figure 9:
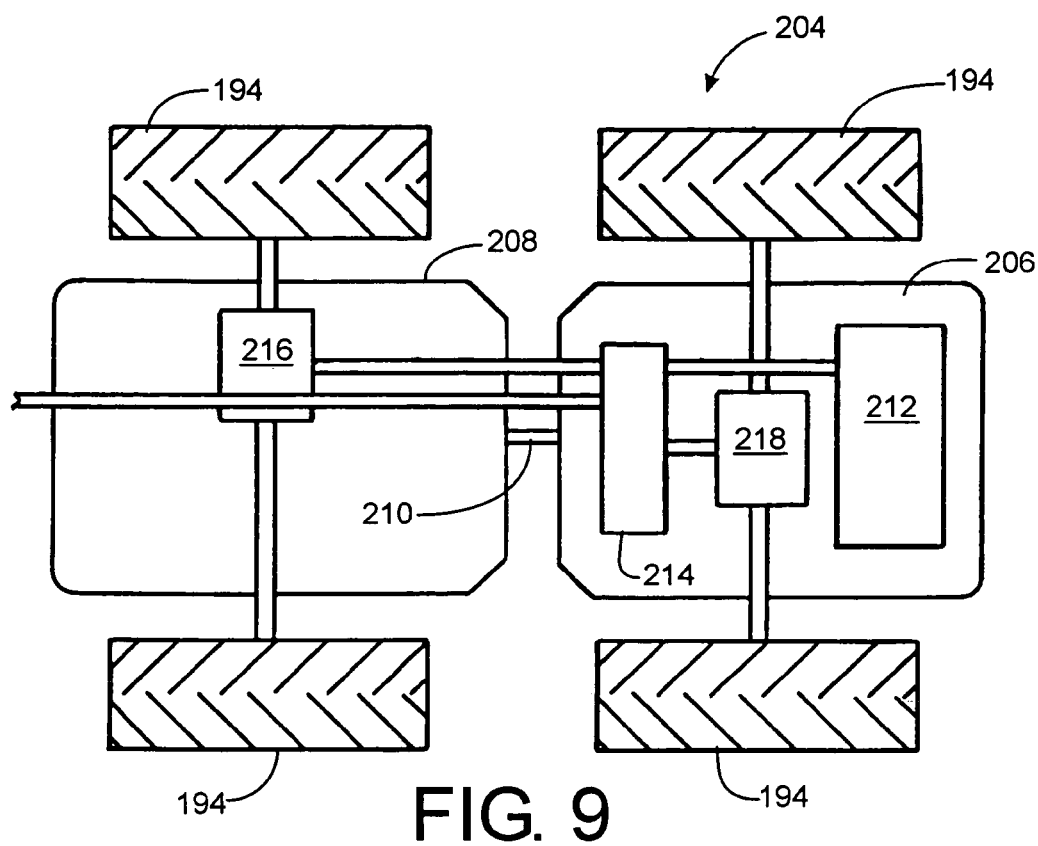
FIG. 9 is a schematic plan view of an articulated, tracked agricultural tractor that includes four track drives such as those shown in FIG. 8.

FIG. 9 shows a plan view of a track drive agricultural tractor 204 in which the face seal according to the preferred embodiment is preferably used. The tractor 204 includes a front frame 206 and a rear frame 208 coupled together with an articulated coupling 210. Tractor 204 has four track drives 194 disposed in fore-and-aft relationship, with two track drives on each of the two vehicle frames. One track drive extends from each side of front frame 206 and one track drive extends from each side of rear frame 208. An engine 212 is fixed to front frame 206 and drives a transfer case 214. Transfer case 214, in turn, drives a rear differential 216 and front differential 218. Left front and right front track drives 194 are coupled to drive shafts extending from the left and right sides of the front differential 218. Left rear and right rear track drives 194 are coupled to drive shafts extending from the left and right sides of rear differential 216.

Figure 7:
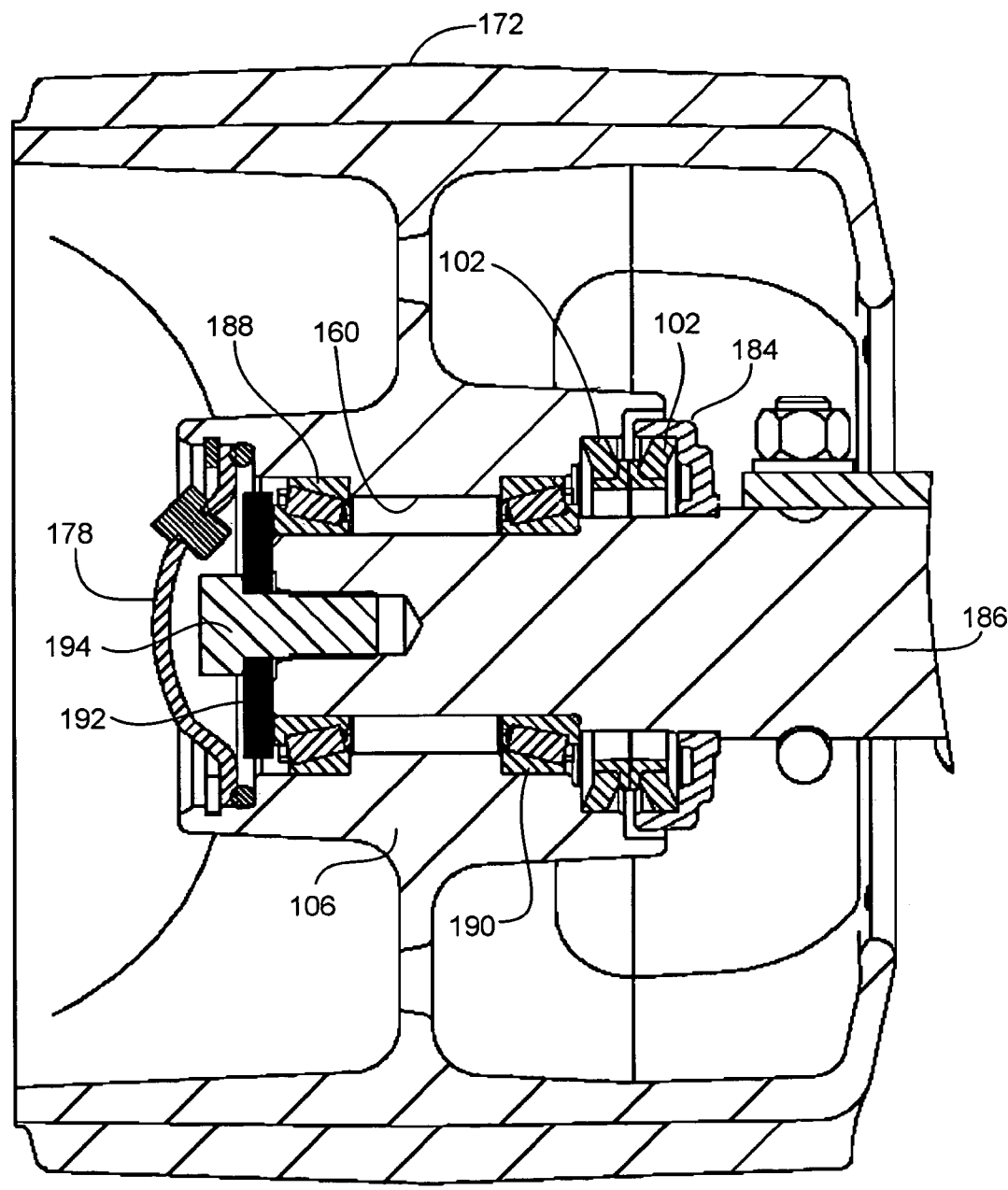
FIG. 7 is a cross-sectional view of a roller wheel including two face seals installed in the manner shown in FIGS. 2-4.
Figure 8:
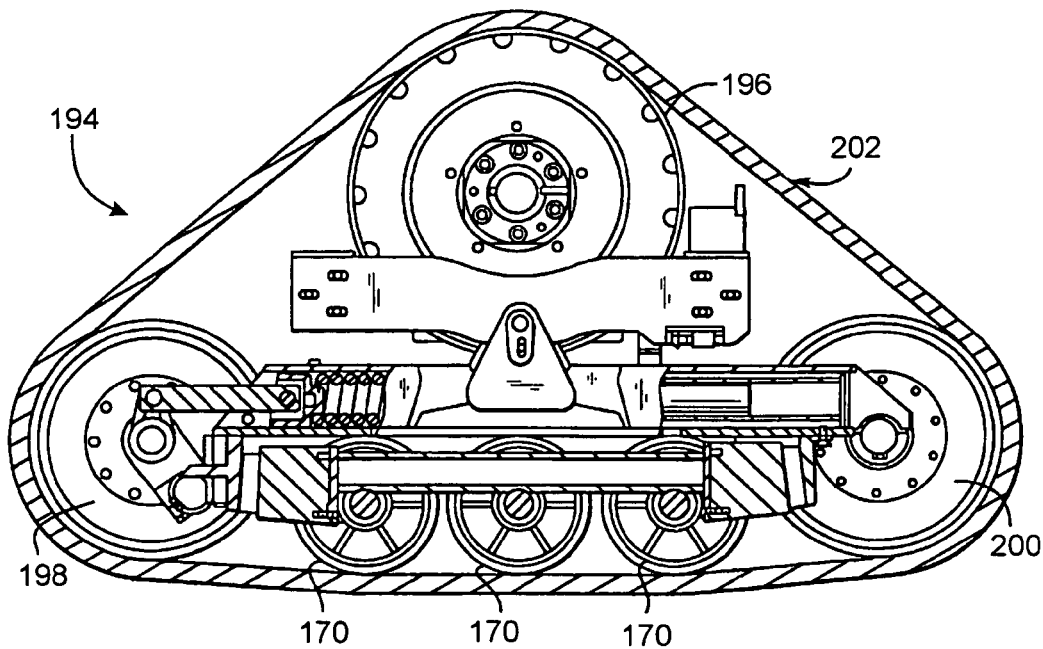
FIG. 8 is a side view of a high-speed elastomeric track drive including eleven track wheels which include three pairs of the roller wheels (shown in FIG. 7) as well as a drive wheel, one pair of front idler wheels and one pair of rear idler wheels about which the track wraps.

FIG. 8 is a side view of known track drive 194 for a tractor such as the one shown in FIG. 9. Track drive 194 includes a drive wheel 196, fore and aft idler wheel pairs 198, 200 and six roller wheel pairs 170 (three shown). An endless reinforced synthetic rubber track 202 extends around the periphery of these eleven wheels and is driven by drive wheel 196. Each of the wheels, especially roller wheels 170, is supported via a track wheel assembly, as shown in FIG. 7.

The track wheel assembly shown in FIG. 7 includes a track wheel 172 mounted for rotation on a shaft assembly. In this embodiment the illustrated track wheel is a roller wheel 172, but it may be an idler wheel. Shaft assembly includes shaft 186 and retainer 184. Retainer 184 is shown as a structure formed separately and mounted upon shaft 186. Alternatively, retainer 184 and shaft 186 could be formed integral with one another.

Two roller bearings 188, 190 are mounted to and between wheel 172 and shaft 186 to support the wheel for rotation on the shaft. A retainer 192 is removably mounted to the free end of shaft 186 with removable threaded fastener 194. Retainer 192 prevents wheel 172 from coming off the end of shaft 186.

Roller wheel 172 includes housing or hub 106 in which a central hole or cavity 160 is formed that receives roller wheel shaft assembly 184/186. A cover 178 seals the end of hole 160. At the opposite end of the hole 160 from the cover 178, a bore 104 is formed in the housing 106. As best seen in FIG. 2, bore 104 is concentric with hole 160. A chamfer or relief 164 provides a slightly larger opening than the diameter of the bore and permits easier entry of the face seal 102 into bore 104.

The inner cylindrical wall 143 of bore 104 is slightly smaller than the outer diameter of outer cylindrical wall 142 of elastomeric ring 128. Outer wall 142 of elastomeric ring 128 and inner wall 143 of bore 104 are configured to mutually interengage each other with a force or interference fit over substantially the entire width of outer cylindrical wall 142.

As shown in FIG. 7, two opposing face seals 102 seal the opposite end of hole 160 from the cover 178 to seal in lubricant. The cavity defined between the wheel and the shaft and extending between the cover and the face seals is relatively small, having an oil capacity of about 8 oz (237 cc) for the roller wheels and about 26 oz (769 cc) for the idlers. Incidentally, the vehicle travels at a typical ground speed of 10-25 mph, which are speeds much greater than the speeds of a typical metal tracked vehicle. The cavity is sealed, and therefore does not receive a continuous supply of oil or other liquid lubricant. The two face seals shown in FIG. 7 are installed in the manner described below with regard to FIGS. 2-5.

As shown in FIG. 1, face seal 102 comprises elastomeric ring 128 and a sealing ring 130. Elastomeric ring 128 is provided to support the sealing ring within bore 104 in which it is mounted. Ring 128 provides a leakproof seal between sealing ring 130 and bore 104. Ring 128 is flexible to compensate for slight misadjustment between bore 104 in which seal 102 is mounted, the seal itself, and an opposing, rotating seal. Elastomeric ring 128 is configured, among other things, to hold sealing ring 130 in proper position with respect to the relative axis of rotation (axis 126) of the seal. The sealing surface of sealing ring 130 defines a plane that is perpendicular to axis 126.

In the preferred embodiment shown in FIG. 1, inner cylindrical wall 132 of elastomeric ring 128 is not bonded to outer cylindrical wall 134 of sealing ring 130. Instead, sealing ring 130 is inserted into elastomeric ring 128 and held therein by friction. Elastomeric ring 128 extends radially outward and slightly leftward (in the manner of a conical section) in an axial direction away from sealing ring 130.

By forming elastomeric ring 128 as a substantially conical section, elastomeric ring 128 extends axially away from sealing ring 130 and, as shown in FIG. 5, forms a gap 136 between bottom 138 of bore 104 when face seal 102 is installed. Gap 136 is large enough to permit sealing ring 130 to flex slightly into bore 104 without abutting bottom 138 even when it is compressed.

As shown in FIG. 1 in cross-section, elastomeric ring 128 has the form substantially of a solid (or filled) trapezoid, preferably parallelogram, including an outer cylindrical wall 142 and a parallel inner cylindrical wall 132, as well as a seal-facing wall 144 and an opposite, parallel wall 146 facing the opposite direction of wall 144. Seal-facing wall 144 and the opposite, parallel wall 146 are at a non-orthogonal angle from inner and outer cylindrical walls 132, 142 to form the filled generally trapezoidal shape of the elastomeric ring 128. The outer cylindrical wall is substantially smooth or featureless; i.e., there are no lips, ribbons or other features for holding the face seal in place during assembly.

The elastomeric ring 128 is configured to handle, among other things, high temperatures, high face pressures, and high face speeds. It is particularly suited for use on high-speed elastomeric tracked undercarriages for an agricultural tractor, such as the wheel assembly and tractor shown in FIGS. 7-9. Among other advantages, the elastomeric ring of the preferred embodiment is believed to be more flexible at low temperature than currently used face seals because of the materials composing the ring—believed unique to interference-fit face seals. We believe that as a result of this flexibility the coefficient of friction is substantially constant from high to low temperatures in comparison to the elastomeric rings of currently used face seals. At any rate, our tests show that the elastomeric ring according to the preferred embodiment does not spin in the housing at low temperature, thus preventing the accelerated wear of the elastomeric ring that is associated with spinning.

The composition of the preferred elastomeric ring 128 is a polymer having high temperature resistance. In particular, the polymer is preferably a fluoropolymer, preferably a fluoroelastomer, more preferably a dipolymer or terpolymer of vinylidene fluoride and hexafluoropropylene, or vinylidene fluoride, hexafluoropropylene and tetrafluoroethylene. These polymers are sold under the trade name VITON GLT by Dow-DuPont.

The preferred elastomeric ring takes a thermal set of less than about 40%, even more preferably less than about 30%, and even more preferably less than about 20% using the ASTM D 395 standard test procedure at 200° C. for 22 hours. "ASTM" refers to the American Society of Testing Materials, which maintains the standard. Fluoropolymers such as VITON provide this resistance to thermosetting.

The preferred elastomeric ring also has a low temperature retraction (a "TR10") of less than about 0 degrees C., more preferably less than about −10 degrees C. and even more preferably less than about −20 degrees C. Elastomers that are rigid at low temperatures are particularly benefited when installed with the force fit described herein. This low temperature retraction is measured per ASTM D 1329.

Turning again to FIG. 1, sealing ring 130 is preferably shaped like an L in cross-section. That is, sealing ring 130 is generally in the shape of an axially-extending right circular cylindrical portion 147 coupled to a radially extending planar ring portion 148. Cylindrical portion 147 preferably has an outer cylindrical wall 134 and an inner cylindrical wall 150 that are spaced apart a constant radial distance. Cylindrical portion 147 preferably has a substantially constant wall thickness measured both in an axial direction and in a circumferential direction.

Ring portion 148 of sealing ring 130 is a generally planar disk having a seal side generally planar wall 152, an opposing planar wall 154 and an outer cylindrical wall or edge 156. Seal side planar wall 152 defines a sealing surface chat is configured to engage an identical mating sealing surface of an adjacent and facing face seal. This arrangement is best seen in FIG. 7, which illustrates two identical face seals 102, 102 that are shown in this face-to-face relationship.

Radial wall 152 of ring portion 148 of scaling ring 130 is generally planar. However, when a pair of opposing face seals 102 is assembled into the wheel assembly 170 shown in FIG. 7, the radial walls 152 of each scaling ring 130 of each face seal 102 will deflect slightly in a known way to encourage the flow of lubricating oil in between the two opposing seal side radial walls 152. As a result, the face seals 102 will only contact along an annulus disposed on the outer periphery of the radial walls 152. When compressed against an opposing face seal, such as shown in FIG. 7, the force between the two surfaces is preferably between 100 lbf (445 N) and 300 lbf(1334 N). Preferably the scaling ring 130 is composed of an iron alloy, as is well known.

In the example shown herein, outer wall 142 of elastomeric ring 128 has an outside diameter of 113.85 mm. Bore 104 has an inside diameter of 113.7 mm. The interference between the inside diameter of the bore and outside diameter of the elastomeric ring is therefore 0.15 mm, or 0.0059 inches. This interference extends around the entire circumference of the elastomeric ring.

This much hole-to-shaft interference for a nominal 114 mm diameter shaft corresponds to an ANSI Class FN-4 or Class FN-5 force fit. In other words, the amount of interference between the outside diameter of the elastomeric ring and the inside diameter of the bore for the given diameters of the ring and the bore correspond to the interference provided in the ANSI "fit" standards for a FN-4 or FN-5 force fit.

For the seals according to the above-illustrated example, a force fit of at least 0.0059 inches interference is preferred. However, one of ordinary skill will appreciate that elastomeric materials with differing moduli of elasticity may fit with more or less interference to seat properly. In general, materials with higher moduli of elasticity require more, or stronger, interference fit. In addition, larger seals generally require larger interferences to provide the same seal-to-cavity friction.

Figure 6:
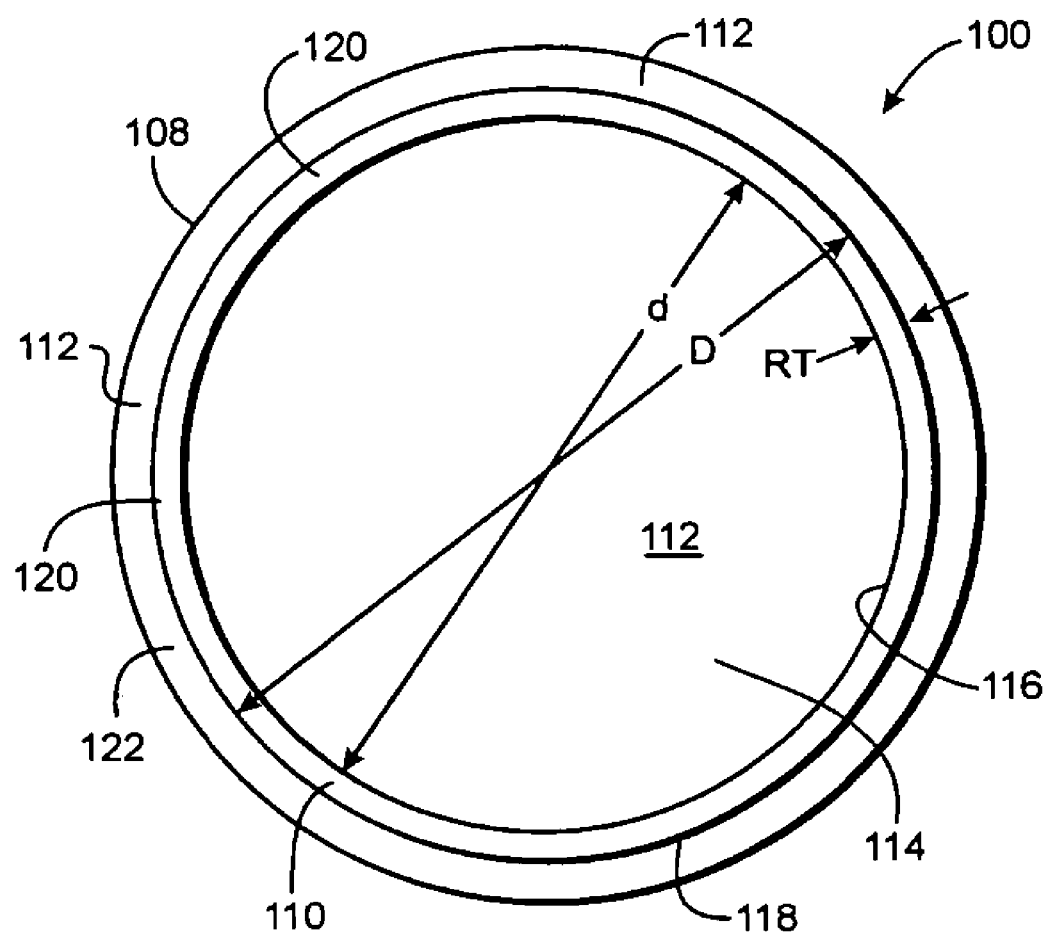
FIG. 6 is a view of the left side of the tool shown in FIGS. 2-5.

Owing to the interference fit of the face seals into the housing 106, a tool 100 is preferably used to insert the face seal 102 into the right circular bore or cavity 104 formed in a housing 106. As shown in FIG. 6, tool 100 includes a solid main body 108 here shown in the form of a cylinder including an annulus or ring 110 extending from front surface 112 of body 108. Ring 110 has an inner diameter d, an outer diameter D, a radial thickness RT, and, as shown in FIG. 2, an axial thickness AT. Ring 110 is fixed to surface 112 of body 108 and defines a central cavity 114 including outer walls formed by ring 110 and a bottom formed by body 108. Ring 110 has an inner wall 116, an outer wall 118, and a planar seal-engaging surface 120 defined between the inner wall and the outer wall.

Ring thickness RT is preferably at least 0.050 inches. This thickness permits ring 110 to engage elastomeric ring 128 of face seal 102 over a width sufficient to force the elastomeric ring into bore 104 while reducing the rolling or twisting of ring 128.

Body 108 defines a planar flange 122 that extends radially outward from ring 110. Flange 122 has circular planar abutting surface that is recessed a distance R from planar surface 120 of ring 110.

All the surfaces, bores, and walls described above are symmetric with respect to the longitudinal axis 126 of tool 100, seal 102, bore 104, and housing 106. The ring, all circumferences, and all diameters described above have their centers disposed along longitudinal axis 126.

FIGS. 3-5 show a series of images illustrating the process of installing the face seal in the housing.

In FIG. 3, the elastomeric ring 128 has been forced into bore 104 such that the outer circumferential surface of the elastomeric ring abuts the inner cylindrical surface of bore 104.

Once the operator places the sealing ring in the FIG. 3 position, the operator grasps the tool body and brings the tool into contact with the outer surface of the elastomeric ring, also as shown in FIG. 3. The tool body is configured to be easily grasped by the operator thereby permitting him to apply even pressure around the entire circumference of the elastomeric ring.

The tool is brought into contact with the elastomeric ring such that there is a slight clearance between tool ring 110 and the rigid sealing ring 130. The tool abuts the elastomeric ring adjacent to the ring of interfering contact formed between surface 142 of the elastomeric ring and the inner surface 143 of bore 104, shown in FIG. 2.

Once the operator has placed ring 110 in contact with the outer edge of the elastomeric ring 128 and presses against the tool body, the operator applies an even force to the tool 100 causing the outer wall or surface 142 of the elastomeric ring to deflect radially inward toward axis 126 and make interfering contact with the inner wall 143 of bore 104 and reducing the outer diameter of elastomeric ring 128 by the same magnitude as the magnitude of the interference fit. Using the tool, the operator keeps applying pressure on the tool body, forcing elastomeric ring 128 of the seal deeper into bore 104 until an outer circumferential surface of the elastomeric ring contacts the bottom of bore 104 as shown in FIG. 4. This ensures that the outer edge of the face seal reaches and touches the bottom of the bore without twisting the elastomeric ring. As a result, a desired spacing between the rigid sealing ring and the bottom of the bore is preserved. This is best shown in FIG. 4 as gap 136.

The tool is specially configured to engage the seal and press it into place. To encourage the elastomeric ring to be seated inside bore 104 without rolling or twisting at its outermost edge, the tool ring engages the elastomeric ring over a radial width (in FIG. 6, radial width or thickness= (d−D)/2=RT) of at least 0.025 inches, more preferably at least 0.050 inches, and even more preferably at least 0.075 inches. This degree of engagement provides support over a substantial width (measured in an axial direction) of the unsupported width of the elastomeric ring. By distributing the force applied by the tool ring against the elastomeric ring over this radial width, the tendency of the elastomeric ring to fold or twist at its outer edge is significantly reduced and the seal can be inserted with gentle hand pressure without significant rolling twisting or wedging.

Referring to FIG. 4, to prevent the elastomeric ring from being over-compressed, crushed and damaged if the tool ring is pressed too hard against it, a means for resisting the over-insertion or over-compression of the seal, embodied here as flange 122, is preferably provided.

The flange 122 is configured to abut housing 106 when the tool ring has just pushed the elastomeric ring to the proper depth, as shown in FIG. 4. In FIG. 4, just at the moment when the tool ring forces the elastomeric ring into contact with the bottom of bore 104, forward movement of the tool ring into bore 104 is prevented, thus preventing the over-compression of or damage to elastomeric ring 128. In an alternative construction other structures can be employed instead of a flange, such as pins, protrusions, scalloped edges, a stepped rim, a castellated edge, clips, standoffs, or spacers, that are disposed between housing 106 and tool 100.

Once the seal has been installed, the tool is removed by withdrawing it as best shown in FIG. 5. When the tool is removed, the gap 136 between the sealing ring and the bottom of the bore remains. An outer circumferential surface of the elastomeric ring remains in contact with the bottom of the bore. The rigid sealing ring remains in substantially the same position as well.

By installing the seal in this manner, the elastomeric ring is not twisted during installation, and (once installed) remains in its installed position. Note also that the tool does not press against the sealing ring at any point during installation. All pressure is applied to the unreinforced outer circumferential edge or surface of the elastomeric ring.

In FIGS. 2-5, the face seal installation tool 100 is shown installing a face seal 102 in a cavity or bore 104 in a housing 106. In a normal application using face seals, the operator also installs an identical mating face seal in an identical manner in an identical cavity or bore in an adjacent surface. These two seals are coaxial. Once they are individually installed, compressed against each other, and the device in which they are inserted is finally assembled (see e.g. FIG. 7), their abutting sealing surfaces define a plane preferably perpendicular to the longitudinal axis about which they rotate with respect to each other if the seal has installed properly. In the example shown in FIG. 2, this is axis 126.

One will appreciate that the present disclosure is intended as an exemplification of the invention, and is not intended to limit the invention to the specific embodiment illustrated. The disclosure is intended to cover by the appended claims all such modifications as fall within the scope of the claims.

We claim:

1. An assembly comprising:
   a wheel defining a wheel cavity defined by an inner cylindrical wall having a predetermined diameter; and
   a face seal including a rigid sealing ring and a flexible ring disposed on the sealing ring, the flexible ring having a trapezoidal shape and including an outermost substantially cylindrical surface defining a maximum diameter of the ring, the flexible ring sized so that in a relaxed state outside of the wheel cavity the maximum diameter of the flexible ring is slightly larger than the diameter of the wheel cavity,
   wherein the face seal is retained within the wheel cavity, by an interference fit of the flexible ring against the inner cylindrical wall defining the wheel cavity, the interference fit having been achieved by application of a force against only an outer edge of the flexible ring adjacent to the outermost substantially cylindrical surface and substantially evenly therearound in an axial direction toward the wheel cavity, such that the diameter of the ring was reduced so as to be equal to or less than the diameter of the inner cylindrical wall to allow the flexible ring to be inserted into the wheel cavity, and removal of the force.

2. The assembly of claim 1, further comprising a shaft assembly and an opposing face seal, the face seal and opposing face seal being in opposed, face-to-face relation, the shaft assembly including a retainer defining a retainer cavity, the retainer being disposed generally in opposition to the wheel, the opposing face seal including a flexible opposing-ring having an outermost cylindrical surface defining an opposing-ring maximum diameter of the opposing-ring, the opposing-ring maximum diameter sized to be slightly larger than the retainer cavity prior to insertion into the retainer cavity, wherein the opposing face seal is disposed within the retainer cavity whereby the opposing face seal is interference fit into the retainer cavity.

3. A track assembly for a tracked vehicle, the track assembly comprising:
   a wheel including a hub, the hub defining a hole and a bore, the hole extending through the wheel and the bore being disposed at one end of the hole;
   a shaft disposed in the hole whereby the wheel is rotatably supported by the shaft;
   a track supported by the wheel;
   a retainer disposed in opposing relation to the bore, the retainer defining a cavity; and
   at least two opposed face seals disposed in a space defined by the retainer and the hub of the wheel, each face seal including a flexible supporting ring having a trapezoidal shape and a rigid sealing ring, the supporting ring having opposed left and right surfaces defining opposed inner and outer surfaces in a radially spaced relationship, the outer surface being substantially smooth from the left to the right surfaces and defining a diameter of the flexible ring, the diameter of each supporting ring prior to installation being larger than one of the bore and cavity such that installation of the supporting ring is an interference fit achieved by application of a force only against an outer edge of the supporting ring adjacent to the outer surface thereof and substantially evenly therearound in a direction for pressing the ring into the bore or the cavity, respectively, such that the diameter of the ring was reduced so as to be equal to or less than the diameter of the bore or the cavity as the ring was inserted therein, and then the force was removed such that the interference fit exists;
   wherein the outer surface of each supporting ring abuts and forms an interference fit with at least one of (i) a surface of the wheel defining the bore and (ii) a surface defining the cavity of the retainer.

4. The track assembly of claim 3, wherein the supporting ring is elastomeric with an ASTM D 395 200° C./22 hr compression set of about 30% or less.

5. The track assembly of claim 3, wherein the supporting ring is elastomeric with an ASTM D 395 200° C./22 hr compression set of about 20% or less.

6. The track assembly of claim 3, wherein the supporting ring is elastomeric with an ASTM D1329 TR10 low temperature retraction of −20° C. or less.

7. The track assembly of claim 3, wherein the supporting ring is elastomeric with an ASTM D1329 TR10 low temperature retraction of −10° C. or lower.

8. The track assembly of claim 3, wherein the sealing ring and supporting ring are concentric.

9. The track assembly of claim 8, wherein the sealing ring is an iron alloy and the supporting ring is an elastomer.

10. A process for installing a face seal in a wheel cavity, comprising steps of:
   providing a wheel mounted for rotation on a shaft assembly, the wheel defining a wheel cavity;
   providing a face seal including a rigid sealing ring and a flexible ring disposed on the sealing ring, the flexible ring having opposed left and right surfaces extending between opposed inner and outer surfaces, the outer surface being substantially featureless from the left to the right surfaces, the outer surface defining a diameter of the flexible ring, the flexible ring sized such that the diameter is slightly larger than a diameter of an inner surface defining the wheel cavity and larger than a diameter of the rigid sealing ring, such that the flexible ring extends radially outwardly of the rigid sealing ring around the face seal;
   providing a face seal installation tool having a ring and structure extending radially outwardly thereof adjacent one end thereof, the ring of the tool having an inner diameter greater than the diameter of the rigid sealing ring so as to be positionable concentric therearound with a radial clearance therebetween, the ring of the tool having an outer diameter enabling insertion thereof into the wheel cavity, and the ring of the tool having a seal-engaging surface extending between the inner diameter and the outer diameter;
   inserting the face seal into the wheel cavity whereby the flexible ring is compressed radially inwardly to fit into the wheel cavity by engaging only the seal-engaging surface of the tool with an outer edge of the flexible ring adjacent to the outer surface thereof and spaced radially outwardly of the rigid sealing ring, and pressing on the tool to apply a force through the tool against only the outer edge of the flexible ring substantially evenly therearound and in an axial direction toward the wheel cavity only, such that the flexible ring is inserted into the wheel cavity without twisting, until the structure of the tool extending radially outwardly of the ring of the tool contacts the wheel around the wheel cavity to position the flexible ring in the wheel cavity; and
   removing the force, such that an interference fit is formed between the flexible ring and the inner surface defining the wheel cavity, to retain the face seal in the cavity.

* * * * *